Aug. 31, 1948.  G. H. PALM  2,448,459
PISTON ACTUATED AIR MOTOR VALVE MECHANISM
Filed Nov. 1, 1943  4 Sheets-Sheet 1

Inventor.
George H. Palm
By Williams, Bradbury & Hinkle
Attorneys.

Aug. 31, 1948.  G. H. PALM  2,448,459
PISTON ACTUATED AIR MOTOR VALVE MECHANISM
Filed Nov. 1, 1943  4 Sheets-Sheet 2

Inventor:
George H. Palm
By Williams, Bradbury & Hinkle
Attorneys.

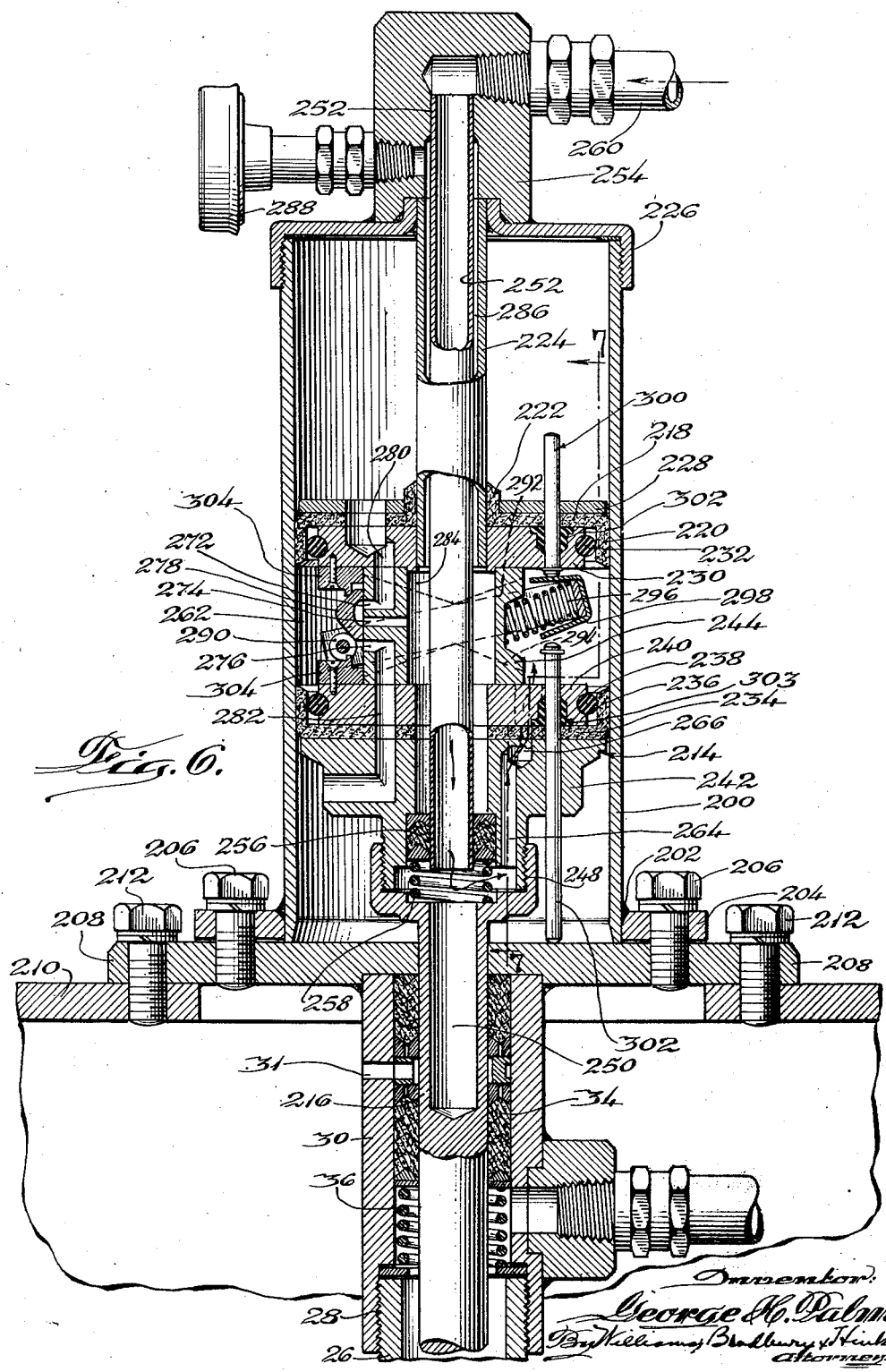

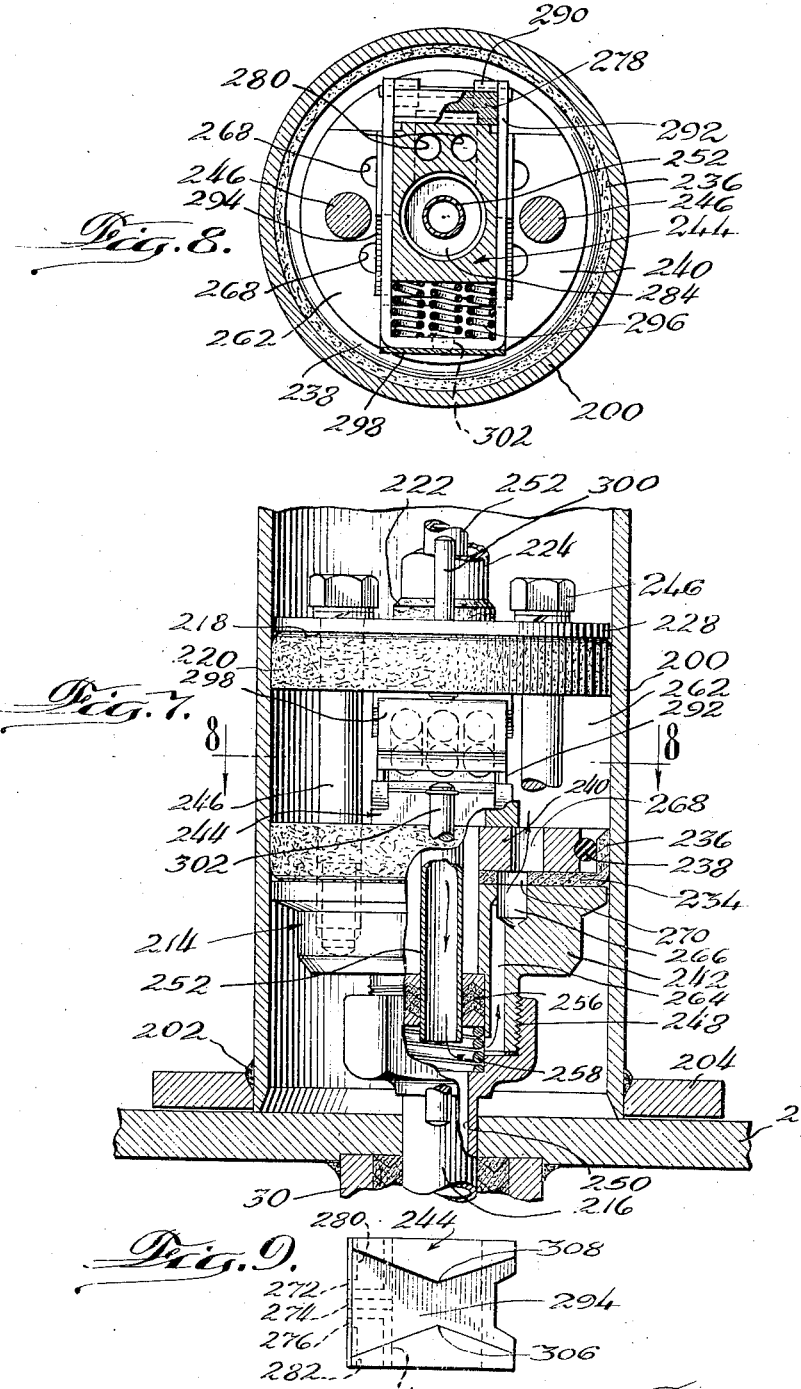

Patented Aug. 31, 1948

2,448,459

UNITED STATES PATENT OFFICE 2,448,459

PISTON ACTUATED AIR MOTOR VALVE MECHANISM

George H. Palm, Chicago, Ill., assignor to Stewart-Warner Corporation, Chicago, Ill., a corporation of Virginia Application November 1, 1943, Serial No. 508,517

2 Claims. (Cl. 121—164)

My invention relates to air motors for grease pumps and is particularly concerned, but not limited to, an air motor for a grease pump which is manually applied to a lubricant drum of the kind in which lubricant is shipped from the refinery.

In garages and service stations for lubricating and otherwise servicing automobiles, it is common to utilize a lubricant pump which may be applied directly to the drum or other shipping container in which lubricant is received from the refinery. This lubricant pump is manually applied to the lubricant drum and manually removed therefrom after the drum has been exhausted of lubricant. Such grease pumps are commonly operated either by electricity or by compressed air through a flexible hose or other communication leading from the air pressure tank utilized to inflate tires and for other general purposes.

An object of my invention is to provide a new and improved air pump particularly adapted to form part of a grease pump of the foregoing type, wherein the mechanism of the air motor is compact and highly efficient.

Another object of my invention is to provide an air motor having a new and improved valve mechanism.

Another object of my invention is to provide a new and improved valve mechanism for utilization with different types of air motors.

Another object of my invention is to provide an air motor which utilizes a minimum number of cast parts and wherein the various parts are designed for minimum expense in manufacture and maximum ease of assembly.

Another object of my invention is to provide a new and improved air motor which is durable and requires a minimum of service and wherein such service as is required may be quickly and easily effected.

Other objects and advantages will become apparent as the description proceeds.

In the drawings:

Fig. 6 is a vertical sectional view of a second preferred embodiment of my invention;

Fig. 7 is a partial vertical section taken on the line 7—7 of Fig. 6;

Fig. 8 is a transverse horizontal section taken on the line 8—8 of Fig. 7; and

Fig. 9 is a side view of a guiding sleeve for the valve operating mechanism.

Figures 1, 2:
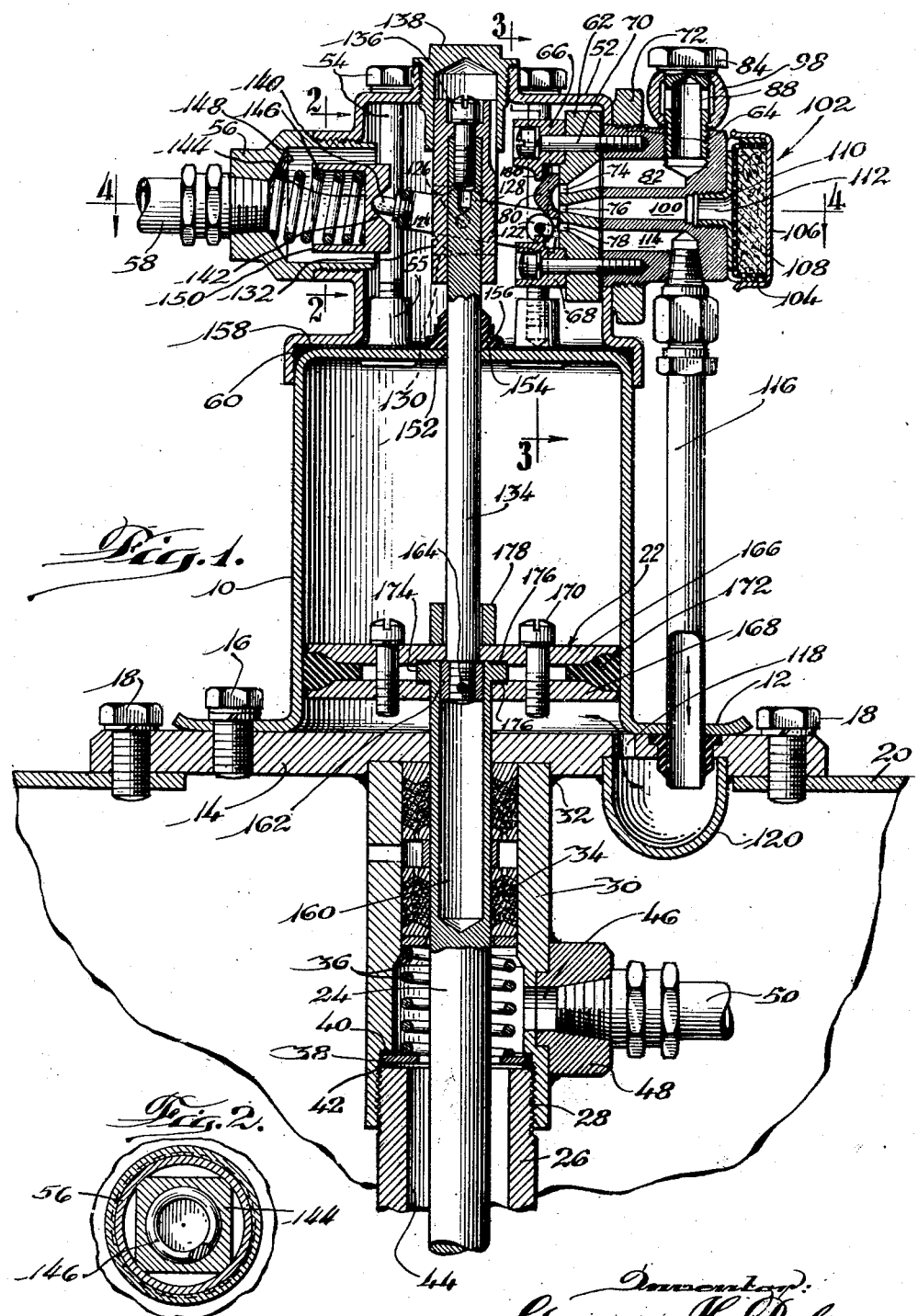
Fig. 1 is a vertical sectional view illustrating one preferred embodiment of my invention and is taken on line 1—1 of Fig. 5.
Fig. 2 is a transverse section through the air inlet of Fig. 1 and is taken on line 2—2 of that figure.
Figure 3:
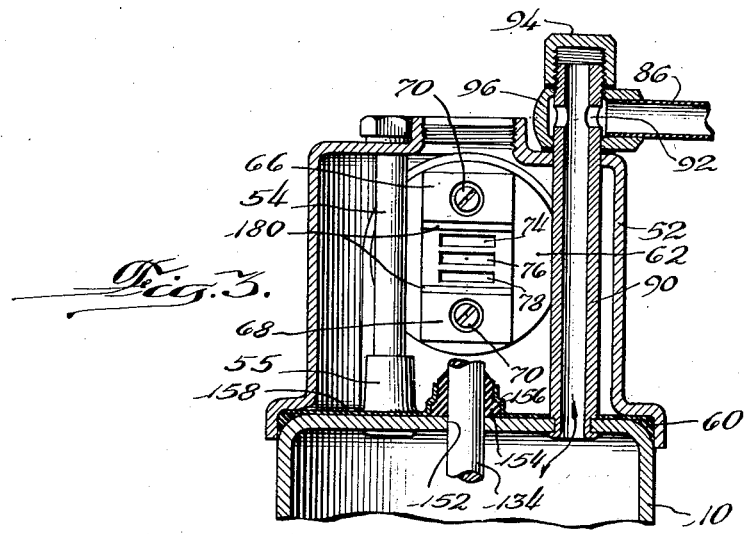
Fig. 3 is a vertical sectional view of the valve mechanism and is taken on line 3—3 of Fig. 1.

In the embodiment of Figs. 1 to 5, inclusive, I have illustrated a preferred form of my invention having a single cylinder 10 pressed or otherwise formed of sheet metal and terminating at its lower end in an outwardly extending flange 12 affixed to a base plate 14 by screws 16 or in any other suitable manner. The base plate 14 in turn is attached by screws 18 to a cover 20 which is adapted to overlie the upper end of a lubricant drum of the kind in which lubricant is shipped from a refinery.

A piston 22 is reciprocably arranged in the cylinder 10 and drives a piston rod 24 extending downwardly through an opening in the base 14. The lower end of this piston rod operates the piston of a lubricant pump which may be of any suitable conventional structure and includes a housing supported by the tube 26. The upper end of this tube 26 is threaded at 28 to the lower end of a sleeve 30 welded at 32 to the base 14. Suitable packing 34 is interposed between the piston rod 24 and sleeve 30 to prevent leakage of either air or lubricant therebetween. This packing is urged into sealing contact with the rod 24 and sleeve 30 by a spring 36 supported on a metal washer 38 resting on the upper end of the tube 26. Sealing washers 40 and 42 are preferably clamped on opposite sides of the washer 38 to prevent escape of lubricant through the threaded connection 28.

Lubricant discharged by the pumping mechanism flows upwardly through a passage 44 surrounding the piston rod 24. This lubricant passes through a bore 46 in a boss 48 attached to the sleeve 30 and then into a conduit 50 which may extend upwardly through a suitable opening in the cover plate 20 and terminate in the usual flexible discharge hose, provided with a control valve having a coupler for establishing a connection with any of the fittings attached to the chassis bearings of automobiles.

A sheet metal cup 52 is secured to the upper end of the cylinder 10 by bolts 54 which screw into bosses 55 attached to the upper end of the cylinder 10. This cup 52 has a threaded nipple 56 secured thereto and a flexible conduit 58 connects this nipple with an air pressure tank or other suitable source of air supply. In order to prevent escape of air from the interior of the cup 52, a sealing washer 60 is interposed between the lower end of this cup and the upper end of the cylinder 10.

A port assembly comprising castings 62 and 64 and stop members 66 and 68 is held together by screws 70. This assembly is located in an opening in a side wall of the cup 52 and is secured in place by a nut 72. This port assembly provides an upper port 74, a center port 76 and a lower port 78 controlled by a slide valve 80.

The upper port 74 communicates through a passage 82 with the interior of a hollow screw 84 which secures one end of a curved pipe 86 (Fig. 5) to the casting 64. This hollow screw 84 has lateral openings 88 which connect passage 82 with the interior of the pipe 86. The other end of the pipe 86 is connected to the upper end of the cylinder 10 through a tube 90 (Fig. 3) affixed at its lower end to the closed upper end of the cylinder 10 and having cross bores 92 communicating with the interior of the pipe 86. The upper end of the tube 90 is closed by a cap 94 which clamps the fitting 96 against the upper end of the cup 52. The opposite end of the pipe 86 is provided with a similar fitting 98 through which the hollow screw 84 passes.

The center port 76 connects with an exhaust passage 100 leading to a muffler indicated generally by reference character 102. This muffler comprises a sheet metal cup 104 having an integral nipple threaded into the casting 64. A sheet metal cover 106 closes the open end of the cup 104 and a mass of horse hair or other similar material 108 is confined between the cover and a perforated cup 110. The cup 104 has a plurality of exhaust outlets 112 through which exhaust air is discharged to atmosphere.

The lower port 78 connects with a passage 114 communicating with the upper end of a pipe 116, whose lower end is in communication with the lower end of the cylinder 10, by way of an opening 118 formed in the base 14 and the interior of a cup 120 welded or otherwise attached to this base.

The valve 80 which controls the ports 74, 76 and 78 is of the D slide valve type having a rear surface engaged by a spool 122. This rear surface is high at the vertical center of the valve and tapers both ways from its high point, as is clearly shown in Fig. 1. The spool 122 is mounted in a yoke 124 pivoted to the pins 126 of a pair of discs 128 located in transverse slots 130 formed in the opposite sides of a crosshead 132. This crosshead is telescoped over the upper end of a valve rod 134 and is attached thereto by a screw 136. A tubular plug 138 threaded into the base of the cup 52 slidably receives the upper end of the crosshead 132 and serves as a guide therefor.

Figure 4:
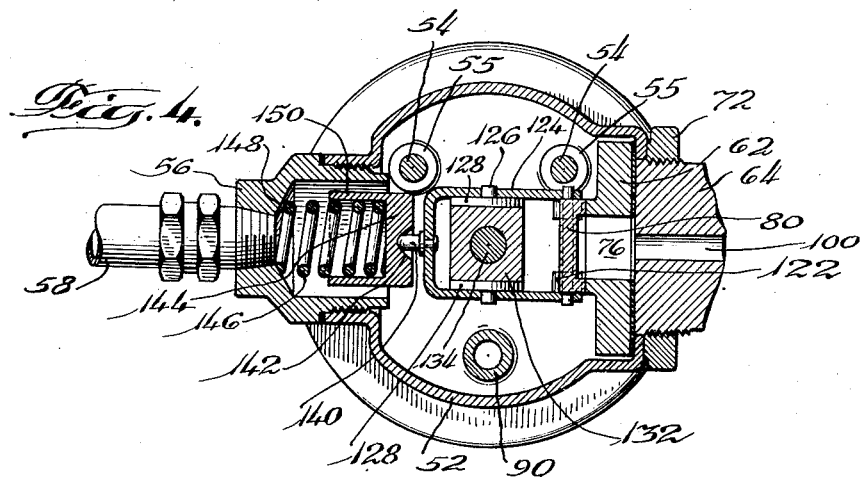
Fig. 4 is a horizontal sectional view of the valve mechanism and is taken on line 4—4 of Fig. 1.
Figure 5:
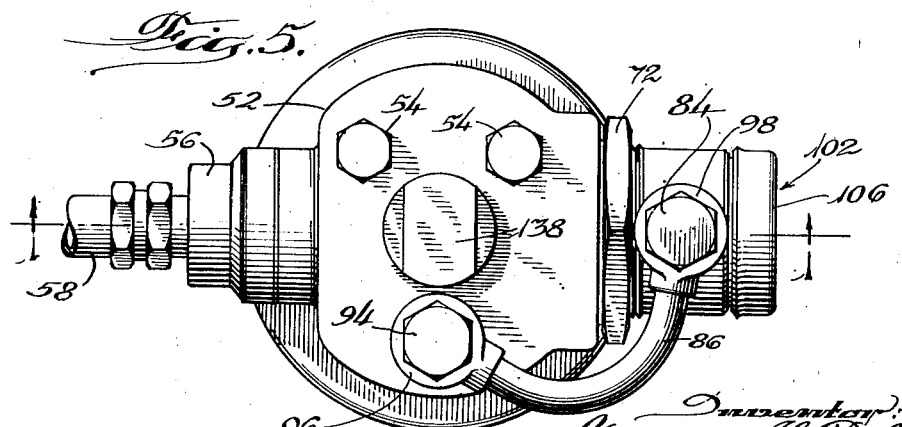
Fig. 5 is a top plan view of the structure shown in Fig. 1.

The free ends of the yoke 124 lie on opposite sides of the valve 80, as clearly shown in Figure 4, and prevent lateral displacement of this valve. The closed end of the yoke 124 is provided with a pin 140 having a rounded end engaging the rounded bottom of the flared depression 142 formed in a shoe 144. A spring 146 is confined between this shoe and a shoulder 148 of the air inlet nipple 56 and serves to urge the spool 122 against the valve 80. The shoe 144 has a tubular extension 150 which receives and guides one end of the spring 146.

The valve operating rod 134 passes through an opening 152 in the upper end of the cylinder 10. This opening is sealed by a hat-shaped sealing member 154 held in place by the annular shoulder 156 formed in a plate 158 confined between the cup 52 and cylinder 10. The lower end of this valve rod passes freely through an opening in the piston 22 and extends into a bore 160 formed in the upper end of the piston rod 24. A sleeve 162 is threaded to the lower end of the valve rod 134 and held against accidental displacement by a pin 164. The sleeve 162 is larger than the opening in the piston 22.

The piston 22 is formed of upper and lower metal plates 166 and 168 held together by screws 170 and clamping a sealing ring 172 therebetween. The upper end of the piston rod 24 has a radial flange 174 located between the plates 166 and 168 whereby this piston rod is caused to follow the movement of the piston 22. Suitable sealing washers 176 are located on opposite sides of this flange to prevent escape of air therepast. Downward movement of the piston 22 is limited by engagement of the screws 170 with the plate 14, and a sleeve 178 loosely surrounding the valve rod 134 engages the upper end of the cylinder 10 to limit upward movement of this piston.

In the position of the parts as shown in Fig. 1, the valve 80 connects port 74 with exhaust port 76 so that the upper end of the cylinder 10 is in communication with atmosphere through the muffler 102. Air supplied to the interior of the cup 52 can flow freely into the lower port 78 and through passage 114, pipe 116, cup 120 and opening 118 to the lower side of the piston 22. The piston will be moved upwardly by the air pressure below it and will produce an upward movement of the piston rod 24. As the piston 22 approaches the upper end of its stroke, spool 122 will roll over the backwardly projecting ridge of the exposed surface of the valve 80 and will wedge this valve downwardly to uncover the upper port 74 and connect the center air exhaust port 76 with the lower port 78. In this position of the valve, air under pressure will be admitted to the upper end of the cylinder by way of pipe 86 and tube 90, and the lower end of the cylinder will be connected to the muffler 102. The resulting downward movement of the piston 22 will create a corresponding downward movement of the piston rod 24 and such reciprocating movement of this rod will operate the pump mechanism and cause it to discharge lubricant through the pipe 50. As the piston 22 approaches the lower end of its stroke a valve operating spool 122 will move across the hump of the valve 80 and return it to the position shown in Fig. 1.

A feature of my invention lies in the fact that valve 80 is operated with a snap action so that there is no possibility of this valve stopping in midposition. As the piston 22 and valve rod 134 move upwardly from the position shown in Fig. 1, the shoe 144 moves upwardly to a slight extent with the yoke 124. It is only as the piston approaches the upper end of its stroke that the spool 122 rolls over the hump of the valve 80 and acts as a wedge interposed between the valve 80 and the lip 180 on the upper stop 66. The full force of the spring 146 is thereupon available quickly to shift the valve 80 to its lowermost position in engagement with the corresponding lip 180 of the lower stop 68. These lips limit vertical movement of the valve 80 and also prevent pressure exerted by the spool 122 on one edge of the valve from forcing the opposite edge of the valve away from the casting 62.

In the embodiment of my invention shown in Figs. 1 to 5, inclusive, the snap action valve and its operating structure are located above the motor cylinder, whereas in the embodiment of my invention shown in Figs. 6 to 9, inclusive, the corresponding valve structure is located within the motor cylinder. In this latter embodiment of my invention, a cylinder 200 formed of a tubular piece of metal is welded at 202 to a base 204 secured by screws 206 to a plate or head 208 closing the lower end of the cylinder 200. A cover 210 for a drum or other suitable lubricant container is attached to the plate 208 by screws 212. The plate 208 has welded or otherwise secured thereto a sleeve 30 which supports the lubricant pump housing and which may be identical with the corresponding sleeve of the previous embodiment. This sleeve supports the tubing 26 attached thereto by the threaded connection 28 and the tubing 26 in turn supports the housing of the lubricant pump.

A composite piston indicated generally by reference character 214 is reciprocable in the cylinder 200 and has a piston rod 216 attached thereto for operating the lubricant pumping mechanism. Packing 34 is interposed between the piston rod 216 and sleeve 30 and is urged into sealing position by the springs 36. As in the previous embodiment the sleeve 30 is provided with a bore 31 through which any air or lubricant leaking along the piston rod may be discharged to atmosphere.

The composite piston 214 comprises an upper cup leather 218 having a depending flange 220 engaging the cylinder wall and an upwardly extending flange 222 slidably engaging a tube 224 welded or otherwise secured to a cap 226 threaded to the upper end of the cylinder 200. The cup 218 is clamped between a metal annulus 228 and an annular plate 230. An expander 232 of neoprene or other suitable material urges the lip 220 of the cup leather into engagement with the cylinder wall.

The composite piston also includes a second cup leather 234 having a flange 236 engaging the cylinder wall and urged thereagainst by an expander 238. This cup leather is confined between an annular plate 240 and a piston head 242. A guiding sleeve 244 for the valve operating mechanism is located between plates 230 and 240 and holds these plates in spaced relation. The composite piston is maintained in assembled relation by bolts 246 which extend through the piston structure and have their threaded ends screwed into the head 242.

The upper end of the piston rod 216 is threaded at 248 to the piston head 242. The upper end of this rod is provided with a bore 250 which is adapted to telescope with a tube 252 affixed to a block 254 welded or otherwise secured to the cylinder cap 226. Packing 256 is interposed between the lower end of the tube 252 and the cylinder head 242 and this packing is maintained in sealing engagement with the tube and head by a spring 258.

Air is supplied through a pipe 260 which connects the air motor with an air pressure tank or any other suitable source of supply. This pipe is threaded into the block 254 and communicates with the tube 252. The lower end of this air supply tube 252 is in open communication with the valve chest 262 formed between plates 230 and 240 of the composite piston 214. Communication between the valve chest 262 and the lower end of tube 252 is established by way of bores 264, 266 and 268 and a port 270 formed in the cup leather 234.

The sleeve 244 provides three ports 272, 274 and 276 controlled by a slide valve 278 which may be identical with the valve 80 of the previous embodiment. The upper port 272 communicates with the upper end of the cylinder by way of the passage 280 and the lower port 276 communicates with the lower end of the cylinder by way of the passage 282. The center port 274 constitutes an exhaust port communicating with atmosphere by way of chamber 284, passage 286 formed between tubes 224 and 252, and exhaust muffler 288 connected to the upper end of this passage.

The slide valve 278 is shifted by a spool or roller 290 mounted in one end of a yoke 292 having side arms located in the double U-shaped slots 294 formed in opposite sides of the rectangular sleeve 244. Springs 296 interposed between the closed end of the yoke and one side of the sleeve 244 urge the spool 290 against the valve 278 and store the energy needed to shift this valve.

The closed end of the yoke 292 is partially surrounded by a U-shaped strip 298 of sheet metal or other suitable material secured to the closed end of the yoke 292 and having slightly tapered or flared sides adapted to be engaged by valve operating pins 300 and 302. Sealing washers 303 of neoprene or other suitable material prevent leakage of air around these pins. Movement of the valve 278 under the thrust of springs 296 is limited by stop members 304 which are provided with extending valve engaging ribs for holding its seat that side of the valve which is not engaged by spool 278.

In the position of the parts shown in Fig. 6, air under pressure is admitted to the lower end of the cylinder, whereas the upper end of the cylinder is connected to atmosphere through muffler 288. The pressure differential across the piston causes upward movement of the piston 214 and piston rod 216. As the piston approaches the upper end of its stroke, upper pin 300 engages the cap 226 and prevents further upward movement of the right hand end of the yoke 292. As the piston continues its upward movement the arms of this yoke pivot about the high spots 306 in the guiding slots 294 (Fig. 9) and spool 290 is caused to roll over the ridge of the valve 278. This compresses the springs 296 and as soon as the spool passes above the ridge of the valve, these springs snap the right hand end of the yoke to lowermost position, thereby moving the lower pin 302 downwardly and causing the spool 290 to shift valve 278 downwardly.

This reverses the connections so that the upper end of the cylinder is now connected to the source of air supply and the lower end of the cylinder is connected to atmosphere. The pressure differential across the piston is therefore reversed and the piston moves downwardly until the lower pin 302 engages plate 208 and prevents free downward movement of the closed end of the valve operating yoke 292. Continued downward movement of the piston causes this yoke to pivot about the upper points 308 of the guiding slots 294 and causes the spool 290 to roll downwardly over the ridge of the valve 278. As soon as the spool 290 passes below this ridge, the energy in the springs 296 snaps the valve to the up position show in Figure 6.

From the foregoing description of two embodiments of my invention, it will be seen that I have provided a new and improved air motor which may assume various forms and wherein simple and effective valve operating mechanism is provided. This valve operating mechanism is of the snap action type and utilizes force stored in a spring to produce the shifting movement of the valve. This force is exerted on a roller wedge and the construction and arrangement is such that a resilient drive is substituted for a positive drive and no possible damage can be incurred by the valve or operating parts therefor. The air motor of my invention is highly efficient as well as simple in construction and any necessary service can be easily effected, since the air motor is so constructed that it may be readily disassembled for inspection or repair.

While I have illustrated and described only two embodiments of my invention, it is to be understood that my invention is not limited to the particular details shown and described and that my invention includes all variations, modifications and equivalents coming within the following claims.

I claim:

1. An air motor of the class described, comprising a cylinder, a piston therein, a port connected to each end of said cylinder, means for supplying compressed air to said ports, a valve controlling admission of air to said ports, said valve having a ridged surface provided with an apex, a roller engageable with said surface, a yoke supporting said roller, a pin rigid with the closed end of said yoke, a plate having a depression universally receiving said pin, a spring pressing said plate against said pin and said roller against said valve, and means connecting said yoke and piston to cause said roller to move over said surface.

2. An air motor of the class described, comprising a cylinder, a valve chest mounted upon the cylinder, means for supplying air under pressure to said valve chest, means providing three valve ports, a connection between one of said ports and one end of said cylinder, a connection between another of said ports and the other end of said cylinder, an exhaust passage connected to the third port, a slide valve movably engaging said ports, said slide valve having a ridged surface, a yoke, a roller mounted therein and engageable with said surface and cooperating therewith to shift said valve, resilient means urging said roller against said surface, a piston in said cylinder, a rod driven by said piston, and pivot discs for said yoke carried by said rod.

GEORGE H. PALM.

REFERENCES CITED

The following references are of record in the file of this patent:

UNITED STATES PATENTS

| Number | Name | Date |
|---|---|---|
| 61,916 | Barden | Feb. 12, 1867 |
| 90,479 | Baldwin | May 25, 1869 |
| 107,830 | Spooner | Sept. 27, 1870 |
| 140,309 | Rogers | June 24, 1873 |
| 142,292 | Stevens | Aug. 26, 1873 |
| 958,492 | Hardy | May 17, 1910 |
| 1,119,425 | Guerin | Dec. 1, 1914 |
| 1,807,231 | Weeks | May 26, 1931 |
| 1,880,650 | Zagst | Oct. 4, 1932 |
| 1,890,341 | Singiser | Dec. 6, 1932 |
| 2,067,635 | Harris et al. | Jan. 12, 1937 |
| 2,215,852 | Klein | Sept. 24, 1940 |
| 2,220,339 | Leathem | Nov. 5, 1940 |
| 2,269,423 | Barks et al. | Jan. 13, 1942 |